United States Patent [19]

Janssen et al.

[11] Patent Number: 4,572,554
[45] Date of Patent: Feb. 25, 1986

[54] KNOT TYING TOOL

[76] Inventors: Owen R. Janssen; George Spector, both of 233 Broadway, RM 3615, New York, N.Y. 10007

[21] Appl. No.: 694,123

[22] Filed: Jan. 23, 1985

[51] Int. Cl.⁴ .............................................. D03J 3/00
[52] U.S. Cl. ................................................ 289/17
[58] Field of Search ........................... 289/1.2, 1.5, 17

[56] References Cited

U.S. PATENT DOCUMENTS

| 2,987,335 | 6/1961 | Tarbox | 289/17 |
| 3,700,272 | 10/1972 | Bauer | 289/17 |
| 3,731,960 | 5/1973 | Pagano | 289/17 |
| 4,403,797 | 9/1983 | Ragland | 289/17 |

FOREIGN PATENT DOCUMENTS 0536976  2/1957  Canada ............................ 289/17

Primary Examiner—Louis K. Rimrodt

[57] ABSTRACT

A knot tying device for forming a barrel knot from two fishing line segments is provided and consists of two identical tools used in symmetrical juxtaposition.

4 Claims, 6 Drawing Figures

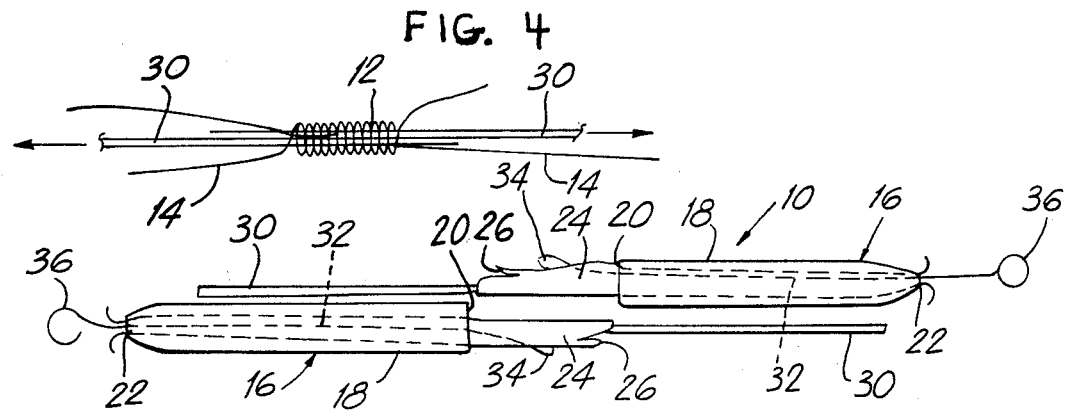
FIG. 4
FIG. 1
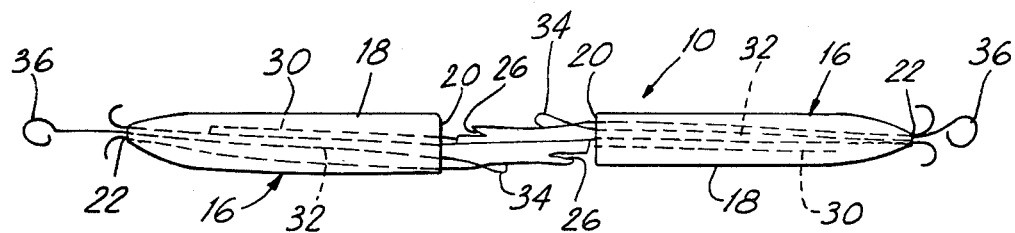
FIG. 2
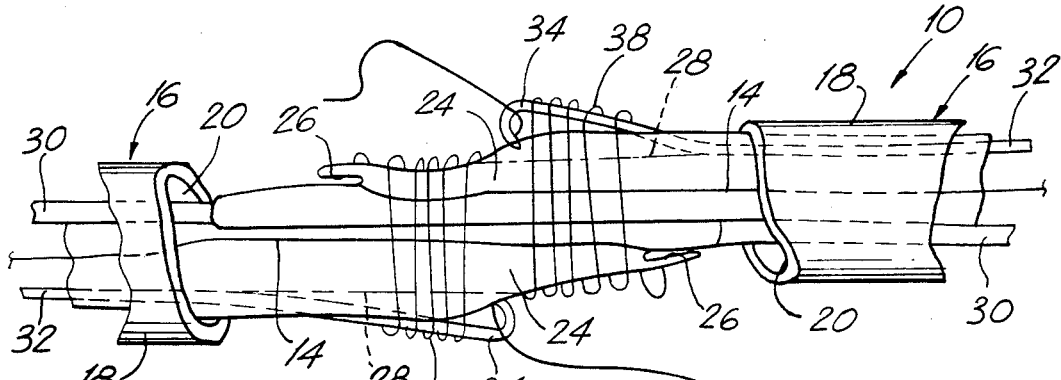
FIG. 3
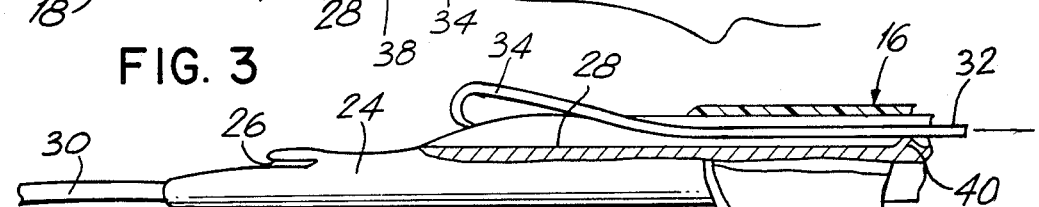
FIG. 5
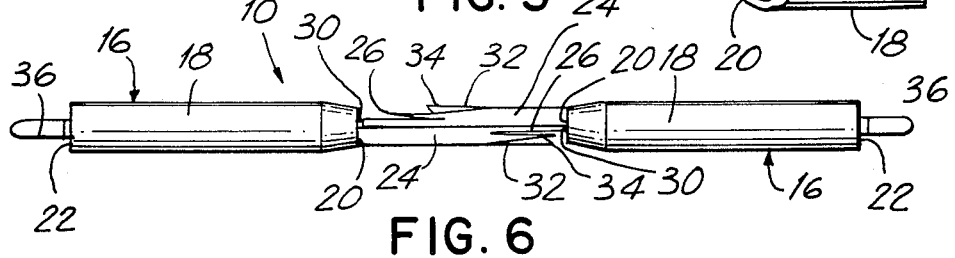
FIG. 6

KNOT TYING TOOL

BACKGROUND OF THE INVENTION

The instant invention relates generally to knots and more specifically it relates to a knot tying device for forming a barrel knot from two fishing line segments.

Numerous tools have been provided in prior art that are adapted to tie fishermen knots. For example U.S. Pat. Nos. 3,700,272; 3,731,960 and 4,403,797 all are illustrative of such prior art. While these units may be suitable for the particular purpose to which they address, they would not be as suitable for the purposes of the present invention as heretofore described.

SUMMARY OF THE INVENTION

A principle object of the present invention is to provide a knot tying device consisting of two identical tools used in symmetrical juxtaposition that makes forming a barrel knot from two fishing line segments quickly with little or no special skill or dexterity.

Another object is to provide a knot tying device that is compact and portable so that it can be carried to any area for use.

An additional object is to provide a knot tying device that is fabricated from durable materials so that it can be used over a long period of time without failure.

A further object is to provide a knot tying device that is simple and easy to use.

A still further object is to provide a knot tying device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side view of the invention with the two tools separated.

FIG. 2 is a side view of the invention with the two tools engaging so that a barrel knot can be formed thereon.

FIG. 3 is an enlarged side view with parts broken away showing details of the barrel knot forming area.

FIG. 4 is a side view with parts broken away showing the two tools partly separated with the barrel knot being formed thereon.

FIG. 5 is an enlarged side view with parts broken away of one of the tools showing a first modification whereby a stop member is provided within the guiding track to allow the hooked member to travel only a predetermined distance.

FIG. 6 is a side view similar to FIG. 2 showing a second modification whereby each hooked member is stationary within each tool.

DETAILED DESCRIPTION OF THE PREFERRED EMBODIMENTS

Turning now descriptively to the drawings, in which similar reference characters denote similar elements throughout the several views, FIGS. 1 through 4 illustrates a knot tying device 10 for forming a barrel knot 12 from two fishing line segments 14. The device 10 consists of two identical tools 16 used in symmetrical juxtaposition.

Each tool 16 consists of a hollow sleeve 18 that has open ends 20, 22, a holder 24 that has a slot 26 and a guiding track 28, a prong 30 and a hooked member 32 that has a hook 34 at one end and a grasping handle 36 at other end.

As best seen in FIG. 3 each holder 24 is affixed and extends outwardly from an open end 20 of the sleeve 18. The slot 26 engages one of the fishing line segments 14 that extends through the sleeve 18 with the fishing line segment 14 wrapped around the holder 24 a few times forming coils 38 thereon.

The prong 30 is affixed at one end to the holder 24 and extends outwardly to engage another sleeve 18 of another tool 16. The hooked member 32 is positioned within the guiding track 28 of the holder 24 with the hook 34 engaging free end of the fishing line segment 14. Pulling of the grasping handle 36 makes free end of the fishing line segment 14 go through the coils 38 forming the barrel knot 12. The hooked member 32 slides within the guiding track member 28 when the grasping handle 36 is pulled back from the sleeve 18.

FIG. 5 shows a first modification wherein the guiding track 28 contains a stop member 40 formed therein. When the hooked member 32 is pulled back the hook 34 will engage with the stop member 40 allowing the hooked member 32 to travel only a pre-determined distance thus preventing the hooked member from jamming within the sleeve 18.

FIG. 6 shows a second modification wherein the hooked member 32 is fixed with the guiding track member 28 so that when the grasping handle 36 is pulled back the sleeve 18 will travel back with the hook 34.

To tie a barrel knot 12 with the knot tying device 10 the following steps should be taken.

1. Place the two tools 16, 16 together in symmetrical juxtaposition as shown in FIG. 2.

2. Hold the first tool 16 in one hand and pull the first fishing line segment 14 through the open end 22 of the sleeve 18 until it is fastened within the slot 26.

3. Hold the second tool 16 in one hand and pull the second fishing line segment 14 through the open end 22 of the sleeve 18 until it is fastened within the slot 26.

4. Wrap free end of the first fishing line segment 14 five or six times around both holders 24, 24 and into hook 34 of the second tool 16 as shown in FIG. 3.

5. Wrap free end of the second fishing line segment 14 five or six times around both holders 24, 24 and into hook 34 of the first tool 16 as shown in FIG. 3.

6. Pull the first and second fishing line segments 14, 14 through coils 38, 38 by pulling grasping handles 36, 36 away from each other.

7. Pull the two tools 16, 16 away from each other holding tension on fishing line segments 14, 14 drawing coils 38, 38 onto prongs 30, 30 as shown in FIG. 4.

8. Remove one tool 16 completely leaving coils 38, 38 on a single prong 30.

9. Pull coils 38, 38 up as tight as possible by pulling hard on both fishing line segments 14, 14. This draws coils 38, 38 together on prong 30.

10. Trim the free ends off of both fishing line segments 14, 14 as close as possible and remove barrel knot 12 from prong 30.

11. Pull hard until you feel both fishing line segments 14, 14 give as exposed ends draw into space left by the removal of the prong 30.

12. Do not allow any slack on fishing line segments 14, 14 until you feel barrel knot 12 set as there is much spring action developed at the time before the barrel knot 12 is set.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A knot tying device for forming a barrel knot from two fishing line segments, said device consisting of two identical tools used in symmetrical juxtaposition, each said tool comprising:
    (a) a hollow sleeve having open ends;
    (b) a holder having a slot and a guiding track, said holder affixed and extending outwardly from one of said open ends of said sleeve so that said slot engages one of said fishing line segments that extends through said sleeve with said fishing line segment wrapped around said holder a plurality of times forming coils thereon;
    (c) a prong affixed at one end to said holder and extending outwardly engaging another sleeve of another tool; and
    (d) a hooked member having a hook at one end and a grasping handle at other end, said hooked member positioned within said guiding track of said holder with said hook engaging free end of said fishing line segment so that pulling of said grasping handle makes free end of said fishing line segment go through said coils forming said barrel knot.

2. A knot tying device as recited in Claim 1, wherein said hooked member slides within said guiding track member when said grasping handle is pulled back from said sleeve.

3. A knot tying device as recited in Claim 2, wherein said guiding track member contains a stop member formed therein so that when said hooked member is pulled back said hook will engage with said stop member allowing said hooked member to travel only a predetermined distance thus preventing said hooked member from jamming within said sleeve.

4. A knot tying device as recited in Claim 1, wherein said hooked member is fixed within said guiding track member so that when said grasping handle is pulled back said sleeve will travel back with said hook.

* * * * *